United States Patent
Johnson et al.

(10) Patent No.: US 9,716,772 B1
(45) Date of Patent: Jul. 25, 2017

(54) REQUEST DELEGATION IN A SERVICE-ORIENTED ARCHITECTURE ENVIRONMENT

(71) Applicant: Amazon Technologies, Inc., Seattle, WA (US)

(72) Inventors: Adam Brent Johnson, Seattle, WA (US); Paul William Berg, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 745 days.

(21) Appl. No.: 14/137,430

(22) Filed: Dec. 20, 2013

(51) Int. Cl.
*G06F 15/173* (2006.01)
*H04L 29/08* (2006.01)

(52) U.S. Cl.
CPC .................. *H04L 67/327* (2013.01)

(58) Field of Classification Search
CPC ..................................... H04L 67/327
USPC ....................................... 709/226
See application file for complete search history.

(56) References Cited

U.S. PATENT DOCUMENTS

| | | | | |
|---|---|---|---|---|
| 2006/0225132 A1* | 10/2006 | Swift | ...................... | G06F 21/33 726/11 |
| 2007/0083875 A1* | 4/2007 | Jennings | ................... | G06F 8/10 719/330 |
| 2010/0088236 A1* | 4/2010 | Karabulut | ............... | G06F 21/10 705/59 |
| 2012/0117626 A1* | 5/2012 | Yates | .................... | H04L 63/101 726/4 |

OTHER PUBLICATIONS

"Lazy evaluation", published online by Wikipedia [online][retrieved on Dec. 20, 2013] retrieved from: http://en.wikipedia.org/wiki/Lazy_evaluation, 9 pps.
"Service-oriented architecture", published online by Wikipedia [online][retrieved on Dec. 20, 2013] retrieved from: http://en.wikipedia.org/wiki/Service-oriented_architecture , 15 pps.

(Continued)

*Primary Examiner* — Vivek Srivastava
*Assistant Examiner* — Karina J Garcia-Ching
(74) *Attorney, Agent, or Firm* — Lee & Hayes, PLLC (57) ABSTRACT

Technologies are described herein for delegating requests in a service-oriented architecture (SOA) environment. A calling service in the SOA environment can delegate the task of obtaining data used in a computation to a called service that performs the computation. In order to delegate, the calling service may provide a request specification that defines a mechanism by which the called service can obtain the data. For example, the request specification might define a request to another service in the SOA for obtaining the data. The calling service might also provide an authentication ticket that can be utilized to confirm that the calling service has delegated the task to the called service. The called service can utilize the request specification and the authorization ticket to obtain the data. The obtained data may then be used to perform a computation. The results of the computation may then be provided to the calling service.

22 Claims, 6 Drawing Sheets

(56) References Cited

OTHER PUBLICATIONS

"Closure (computer science)", published online by Wikipedia [online][retrieved on Dec. 20, 2013] retrieved from: http://simple.wikipedia.org/wiki/Closure_(computer_science), 14 pps.

She, W. "Delegation-based Security Model for Web Services", Proceedings of 10$^{th}$ IEEE High Assurance Systems Engineering Symposium, 2007, © 2007 IEEE, published by IEEE, pp. 82-91.

* cited by examiner

REQUEST DELEGATION IN A SERVICE-ORIENTED ARCHITECTURE ENVIRONMENT

BACKGROUND

In certain computing environments, such as computing environments implemented using a service-oriented architecture ("SOA"), it is not uncommon for a service to obtain data from one or more data sources and then to provide the obtained data to another service for processing. In some cases, however, the called service may utilize only a portion of the data obtained and provided by the calling service. In cases such as this, the calling service may waste computing resources, such as central processing unit ("CPU") cycles and network bandwidth, obtaining and transmitting data that is not utilized by the called service.

As a simple example of the scenario described above, a called service may be requested to return the product of a set of numbers provided by a calling service. In the act of multiplying the numbers, the called service may encounter the number zero. Since all other numbers not yet inspected by the called service cannot change due to the fact that the final result will be zero, the called service may stop multiplying and return zero to the calling service when the zero is encountered. In this example, the calling system may have gathered a significant amount of numbers that are not inspected by the called service. This act of gathering may have required multiple service calls to other systems, services or databases. The computing resources unnecessarily expended in gathering and transmitting unused data in scenarios such as these may be significant.

It is with respect to these and other considerations that the disclosure made herein is presented.

DETAILED DESCRIPTION

The following detailed description is directed to technologies for request delegation in a SOA environment. Utilizing an implementation of the technologies disclosed herein, a calling service can delegate the collection of data to another service in the SOA environment. In the simple example discussed above, for instance, the calling service might delegate the collection of numbers to be multiplied to the service that performs the multiplying operation. In this scenario, the called service will stop performing service or database calls to retrieve numbers once a zero has been encountered. In this way, the speed of the entire computation can be improved, and unneeded database calls and transmission of unused data may be avoided.

According to one embodiment disclosed herein, a service (which might also be referred to herein as an "origin service" or a "calling service") in a SOA environment can delegate the task of obtaining data used in a computation to another service (which might also be referred to herein as a "recipient service" or a "called service"), such as the service that performs the computation. In order to perform such a delegation, the origin service may provide a request specification to the recipient service that defines requested data along with a mechanism by which the recipient service can obtain the data for use in the computation. For example, and without limitation, the request specification might define a request to another service (which might also be referred to herein as a "data provider service") in the SOA from which the requested data can be obtained. The request specification might alternately identify a mechanism through which the source of the requested data can be identified.

The origin service might also provide an authentication ticket to the recipient service that can be utilized by the service from which the data is obtained (i.e. the data provider service) to confirm that the origin service has delegated the data collection task to the recipient service. The recipient service can utilize the request specification and the authorization ticket provided by the origin service to obtain the data from the data provider service on behalf of the origin service. The recipient service may then utilize the obtained data to perform a computation. The recipient service may then provide the results of the computation to the origin service. The origin service may store the received results in a cache and/or utilize the received results in other ways. Additional details regarding these and other aspects of the technologies presented herein for request delegation in a SOA environment will be described below with regard to FIGS. 1-5.

It should be appreciated that the subject matter presented herein may be implemented as a computer process, an electronic computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1A:
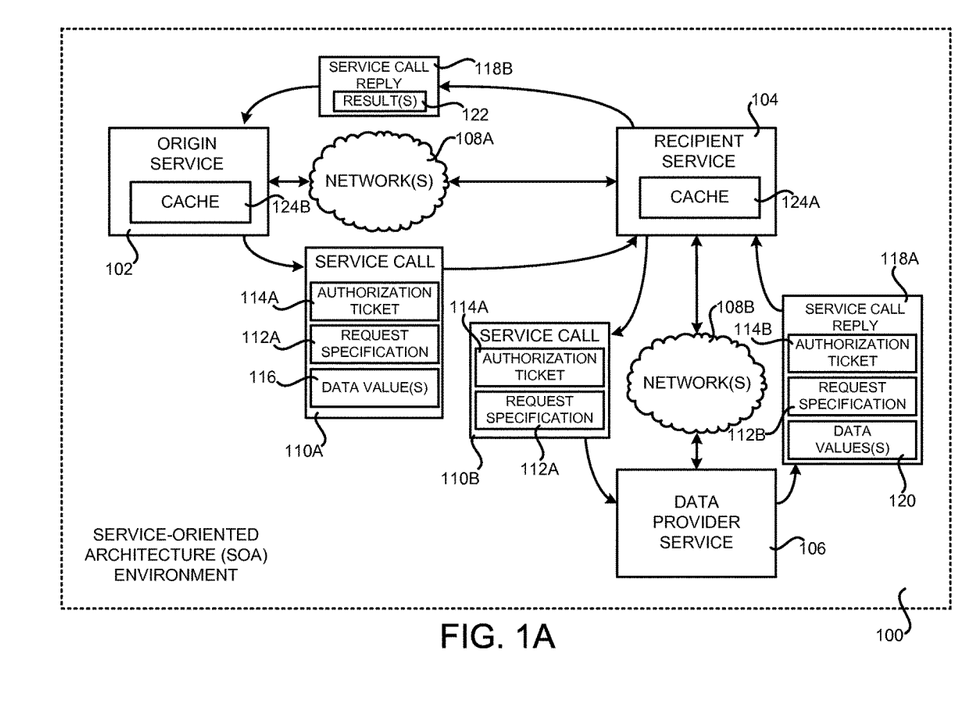
FIG. 1A is a system diagram showing aspects of a mechanism presented herein for request delegation in a SOA environment, including several software and hardware components utilized in embodiments disclosed herein.
Figure 1B:
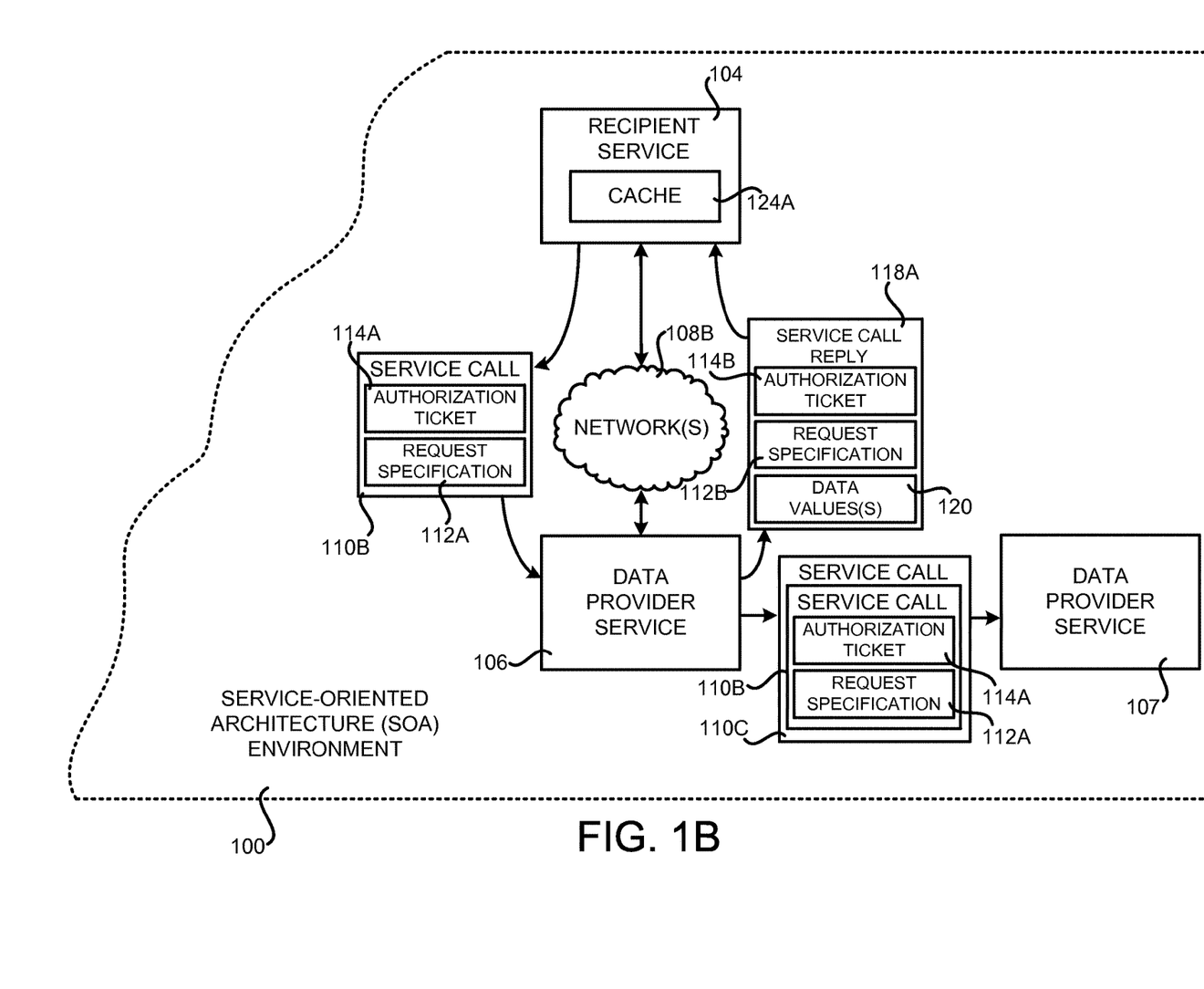
FIG. 1B is partial view of the a system diagram shown in FIG. 1A.

FIG. 1A is a system diagram showing aspects of a mechanism presented herein for request delegation in a SOA environment, including several software and hardware components utilized in embodiments disclosed herein. As shown in FIG. 1A, a SOA environment 100 may form an operating environment for the embodiments disclosed herein. The SOA environment 100 is a computing environment that is implemented utilizing a service-oriented architecture ("SOA"). As known to those skilled in the art, a SOA allows services to be implemented that provide functionality to other services and/or applications. The services may be unassociated, loosely coupled and self-contained. The functionality provided by services in the SOA environment 100 may be combined in order to implement aspects of an application using the SOA environment 100.

The services in the SOA environment 100 may utilize various mechanisms to describe the services themselves, such as the Web Services Description Language ("WSDL"). Various mechanisms might also be utilized to describe the protocols utilized for inter-service communication, such as the Simple Object Access Protocol ("SOAP"). Various transport mechanisms might also be utilized to enable communication between the services in the SOA environment 100, such as the Hypertext Transfer Protocol ("HTTP"). It should be appreciated that other transport mechanisms might also be utilized. Additionally, other technologies might also be utilized for service discovery and service communication. In this regard, it should be appreciated that the description of the SOA environment 100 presented herein has been simplified for discussion purposes. Many other technologies may be utilized to implement services in a service-oriented architecture that will be apparent to those skilled in the art.

The example SOA environment 100 shown in FIG. 1A includes three illustrative services: the origin service 102; the recipient service 104; and the data provider service 106. The services 102, 104 and 106 are interconnected by one or more networks 108A and 108B. The networks 108A and 108B may be local area networks ("LANs"), wide area networks ("WANs"), the Internet, or any combination of these or other types of networks. Additionally, although not shown explicitly in FIG. 1A, the origin service 102 may be configured to communicate directly with the data provider service 106 over one or more suitable networks. Moreover, it should be appreciated that although three illustrative services 102, 104 and 106 and two networks 108A and 108B have been shown in FIG. 1A, the SOA environment 100 may include many more services, systems, networks, and other components. For example, and without limitation, the SOA environment 100 might include various computer systems for executing the illustrated services 102, 104 and 106. These computer systems have not been shown in FIG. 1A for ease of illustration.

In the example shown in FIG. 1A, the recipient service 104 is a service that is configured to perform processing of some type in response to requests from other services. For example, and without limitation, the recipient service 104 might perform processing on data received in a service request from the origin service 102 and return the results of the processing to the origin service 102. In a typical implementation, the origin service 102 would gather and provide the data to be processed to the recipient service 104. For example, and without limitation, the origin service 102 might obtain data from one or more other services, such as the data provider service 106. The origin service 102 would then provide the gathered data to the recipient service 104 along with a request to perform the desired processing. In turn, the recipient service 104 performs the desired process and returns a result to the origin service 102.

The mechanism described just above for obtaining data and providing data to the recipient service 104 may be inefficient for a number of reasons discussed above. For example, the origin service 102 might gather and provide the data to the recipient service 104 that is ultimately not utilized by the recipient service 104 to perform the requested computation. Additionally, inefficiencies might be presented in the scenario described above where the recipient service 104 is "closer" to the data provider service 106 than the origin service 102. For example, the recipient service 104 may be considered closer to the data provider service 106 if it is connected to the data provider service 106 via a LAN while the origin service 102 is connected to the data provider service 106 via a WAN. In this case, the origin service 102 may be obtaining data from the data provider service 106 over a higher latency lower performance network connection than the recipient service 104 would utilize to obtain the same data from the data provider service 106. The recipient service 104, however, may not be authorized to obtain data from the data provider service 106. The embodiments disclosed herein attempt to address these and potentially other considerations.

According to one embodiment disclosed herein, the origin service 102 is configured to delegate requests to generate and/or obtain data for use in processing to the recipient service 104 and/or potentially other services. Utilizing the mechanism disclosed herein, the recipient service 104 can obtain data from the data provider service 106, or another service, on behalf of the origin service 102. The data provider service 106 may be configured to obtain only the data that it needs to perform its computations. For instance, in the example given above, if the recipient service 104 is configured to multiply numbers obtained from the data provider service 106, the recipient service 104 may be configured to stop obtaining data from the data provider service 106 if a zero is encountered. The recipient service 104 then returns the result of the computation to the origin service 102. In this manner, unnecessary collection, re-transmission, and processing of data may be avoided.

In order to implement the mechanism described above for delegating requests in the SOA environment 100, the origin service 102 may be configured to generate a service call 110A to the recipient service 104. The service call 110A identifies the origin service 102 and requests that the recipient service 104 perform some processing. The service call 110A might include one or more data values 116 for use by the recipient service 104 in the performance of the processing.

As shown in FIG. 1A, the service request 110A might also include a request specification 112A. The request specification 112A is data that defines a mechanism by which the recipient service 104 can obtain data for use in performing its computations. For example, and without limitation, the request specification 112 might define a service call to the data provider service 106 through which the recipient service 104 can obtain data on behalf of the origin service 106.

The request specification 112 might alternately define a local function that the recipient service 104 can utilize to generate the data. The request specification 112A might also define other mechanisms that the recipient service 104 can utilize to obtain and/or generate data on behalf of the origin service 102.

As also shown in FIG. 1A, the service call 110A generated by the origin service 102 might also include an authorization ticket 114A. The authorization ticket 114A is data that a service, such as the data provider service 106, can utilize to verify that another service (i.e. the origin service 102) has authorized collection of data on its behalf. In some embodiments, the authorization ticket 114A is unique data obtained by the origin service 102 from the data provider service 106 prior to the generation of the service call 110A. In such an embodiment the data provider service 106 may verify the authenticity of the data contained in the authorization ticket 114A with the data provided to the origin service 102. The data provider service 106 may decline a request if the data in the authorization ticket 114A does not match the unique data previously provided to the origin service 102.

In another embodiment, the authorization ticket 114A is a session token. For example, a session token may be provided that includes a timestamp. For example, the timestamp may indicate the time at which the authorization ticket 114A was generated. In this example, the data provider service 106 may utilize the contents of the authorization ticket 114A to ensure that a delegated request for data is received within a certain predefined period of time. The data provider service 106 may decline a request if the data in the authorization ticket 114A indicates that the request to the data provider service 106 was not provided within the predefined period of time after the authorization ticket 114A was generated.

In yet another embodiment, the authorization ticket 114A may include a list of services that are authorized to obtain data on behalf of the origin service 102. For instance, in the example shown in FIG. 1A, the list might identify the recipient service 104. The data provider service 106 may determine whether a requesting service (e.g. the recipient service 104) is identified in the list. If the requesting service is not identified in the list of authorized services contained in the authentication ticket 114A, the data provider service 105 may decline the request. The list might be specified in a manner to identify authorized services by type in some embodiments. In this way, classes of services may be identified as authorized in the authorization ticket 114A rather than individual services.

It should be appreciated that various mechanisms might also be utilized to secure the contents of the request specification 112A and/or the authorization ticket 114A. For example, and without limitation, the origin service 102 may cryptographically sign the authorization ticket 114A and/or the request specification 112A with a private encryption key. In this example, the data provider service 106 may be equipped with the public encryption key 102 for the origin service 102. Through the use of the public encryption key, the data provider service 106 can verify that the origin service 102 was the originator of the authorization ticket 114A and/or the request specification 112A. The authorization ticket 114A and/or the request specification 112A might also be signed with other types of data in other embodiments. It should be appreciated that other mechanisms might also be utilized to secure the contents of the request specification 112A and/or the authorization ticket 114A. In this regard, it should also be appreciated that the various implementations described herein for the authorization ticket 114A are merely illustrative and that the authorization ticket 114A might include other types of data through which a data provider service 106 can verify that one service (e.g. the origin service 102) has authorized another service (e.g. the recipient service 104) to obtain data on its behalf.

Once the origin service 102 has generated the service call 110A, the origin service 102 transmits the service call to the recipient service 104. In this regard, it should be appreciated that the service call 110A might be passed along a chain of services in the SOA environment 100. Various services in the service chain may be authorized to act on behalf of the origin service 102 to generate or obtain data from the data provider service 106. The obtained data may be added to the service call 110A and passed along the service chain. In this regard, it should be appreciated that other services not shown in FIG. 1A might also utilize the mechanism disclosed herein to act on behalf of the origin service 102.

In response to receiving the service call 110A, the recipient service 104 begins performing its processing. If the recipient service 104 determines that additional data values are needed to perform its processing (i.e. data values in addition to any data values 116 provided in the service call 110A), the recipient service 104 may generate a service call 110B to the data provider service 106 to obtain the additional data values. As shown in FIG. 1A, the service call 110B includes the request specification 112A and the authorization ticket 114A provided by the origin service 102 in the service call 110A.

The data provider service 106 receives the service call 110B from the recipient service 104 and, in turn, utilizes the contents of the authorization ticket 114A to determine whether the origin service 102 has properly delegated authority to the recipient service 104 to retrieve data from the data provider service 106. The data provider service 106 may utilize various mechanisms to make this determination based upon the type of data provided in the authorization ticket 114A. Some of these mechanisms are discussed above. Additionally, the data provider service 106 might also utilize the public encryption key of the origin service 102 to verify the contents of the authorization ticket 114A and/or the request specification 112A if the origin service 102 cryptographically signed these items. Other mechanisms might also be utilized to verify the origin service 102 as the creator of these items.

If the data provider service 106 verifies the authenticity of the authorization ticket 114A and the request specification 112A and also determines that the recipient service 104 has been authorized to act on behalf of the origin service 102, the data provider service 106 performs the request defined by the request specification 112A. For example, and without limitation, the data provider 106 might generate a reply 118A to the service call 110B that includes data values 120. The data values 120 may be retrieved from a data store, generated by the data provider service 106, and/or obtained in some other manner.

In some embodiments, the data provider service 106 is also configured to include an authorization ticket 114B and a request specification 112B in the reply 118A. The recipient service 104 may utilize the authorization ticket 114B and the request specification 112B to obtain additional data values from the data provider service 106. Using this mechanism, the recipient service 104 might call the data provider service 106 for a first set of data values (e.g. the data values 120) and later call the data provider service 106 for additional values. This process may continue indefinitely. In this way, the recipient service 104 might request only those data values it needs to perform its processing operations from the data provider service 106.

It should be appreciated that the mechanism described above may allow arbitrarily sized data, even infinitely sized data, to be passed by using the request specification 112A as a data generator. If the data 116 being passed is a list of items, for instance, then the list may be completely resolved, or only partially resolved by obtaining data values 120 from the data provider service 106 in the manner described above. The act of inspecting passed the resolved tail of the list would trigger further resolution by obtaining additional data values from the data provider 106 in the manner described above, thereby expanding the list further by either a single element or a block of elements.

For instance, a service, such as the recipient service 104 may require a parameter, which is a list of all of the prime numbers. The caller (e.g. the origin service 102) may send an unresolved list that consists only of a request specification 112A for retrieving or calculating the prime numbers. When the recipient service 104 is required to inspect the list for the fifth number in the list, the request specification 112A may be utilized to calculate the first five elements (e.g. obtain the first five elements from the data provider service 106). The storage requirements then required to pass this list along to another service in the SOA environment 100 is now only five numbers plus the request specification 112A, even though the list is actually of infinite size. The list need not only resolve to the five numbers, but may execute the request specification 112A in "chunks," such as resolving only in chunks of the next 256 numbers when the latency required to perform a resolution is greater than the time to calculate a chunk of smaller size.

In response to receiving the reply 118A from the data provider service 106, the recipient service 104 may perform its processing operations. The recipient service 104 may perform its processing operations on the data values 120 returned from the data provider service 106 and/or any data values 116 provided from the origin service 102 in the initial service call 110A. The recipient service 104 might also store data values 120 received from the data provider service 106 in a cache 124A. The contents of the cache 124A may be utilized to process future service calls without making a service call to the data provider service 106. The recipient service 104 may then provide a reply 118B to the service call 110A that includes the results 122 of its processing operations. As mentioned above, the origin service 102 might also store the results 122 in a cache 124B for use in responding to future requests. Additional details regarding the mechanisms disclosed herein for delegating requests in a SOA environment 100 will be provided below with regard to FIGS. 2-5.

In some embodiments, a data service provider 106 may obtain data requested by a recipient service 104 from another data provider. For instance, in the example shown in FIG. 1B, the data provider service 106 is transmitting a service call 110C to the data provider service 107. The service call 110C includes the service call 110B that was transmitted from the recipient service 110 to the data provider service 106. In this way, the service call 110B is nested within the service call 110C. The data provider service 107 may utilize the request specification and authorization ticket 114A in the service call 110C to authorize the request and to return data to the data provider service 106 in the manner described above. The data provider service 106 may then return the data and potentially other data to the recipient service 104. It should be appreciated that the data provider service 107 might pass the service call 110B to another data provider in a similar manner.

Figure 2:
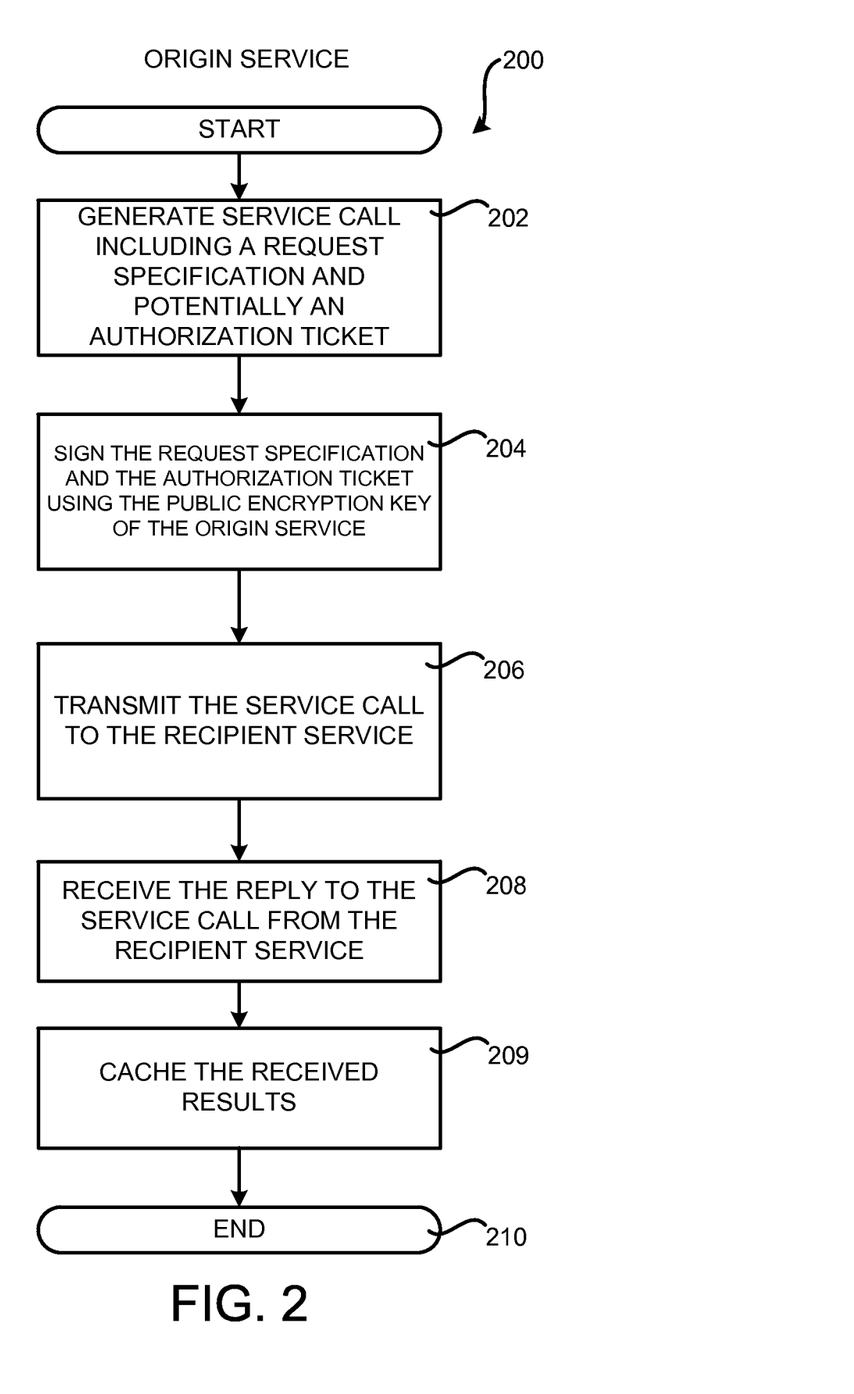
FIG. 2 is a flow diagram showing a routine that illustrates aspects of the operation of an origin service in a mechanism for delegating requests in a SOA environment according to one embodiment disclosed herein.

FIG. 2 is a flow diagram showing a routine 200 that illustrates aspects of the operation of the origin service 102 in a mechanism disclosed herein for delegating requests in the SOA environment 100. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where the origin service 102 generates a service call 110A to the recipient service 104. As discussed above, the service call 110A identifies the origin service 102 and requests that the recipient service 104 perform some type of processing for the origin service 102. The service call 110A might include one or more data values 116 for use by the recipient service 104 in the performance of the computation. As discussed above, the service request 110A might also include a request specification 112A and an authorization ticket 114A. The authorization ticket 114A may be unique data obtained from the data provider service 106 prior to the generation of the service call 110A, may be a timestamp, may be a list of services that are authorized to obtain data on behalf of the origin service 102, or may be other types of data in other embodiments.

From operation 202, the routine 200 proceeds to operation 204, where the origin service 102 may cryptographically sign the authorization ticket 114A and/or the request specification 112A with its private encryption key. As discussed briefly above, and in more detail below, the data provider service 106 may be equipped with the public encryption key 102 for the origin service 102. Through the use of the public encryption key, the data provider service 106 can verify that the origin service 102 was the originator of the authorization ticket 114A and/or the request specification 112A. Other mechanisms might also be utilized in other embodiments to authenticate the contents of the request specification 112A and/or the authorization ticket 114A.

Once the origin service 102 has generated and signed the contents of the service call 110A, the origin service 102 transmits the service call to the recipient service 104 at operation 206. The routine 200 then proceeds from operation 206 to operation 208, where the origin service 102 may receive a reply 118B to the service call 110A that includes the results 122 of the processing performed by the recipient service 104. The origin service 102 may then utilize the results 122 in various ways. From operation 208, the routine 200 proceeds to operation 209, where the origin service 102 may store the results 122 in a cache 124B. The origin service 102 may utilize the data stored in the cache 124B to perform future processing without having to query the recipient service 104 in the manner described herein. From operation 209, the routine 200 proceeds to operation 210, where it ends.

Figure 3:
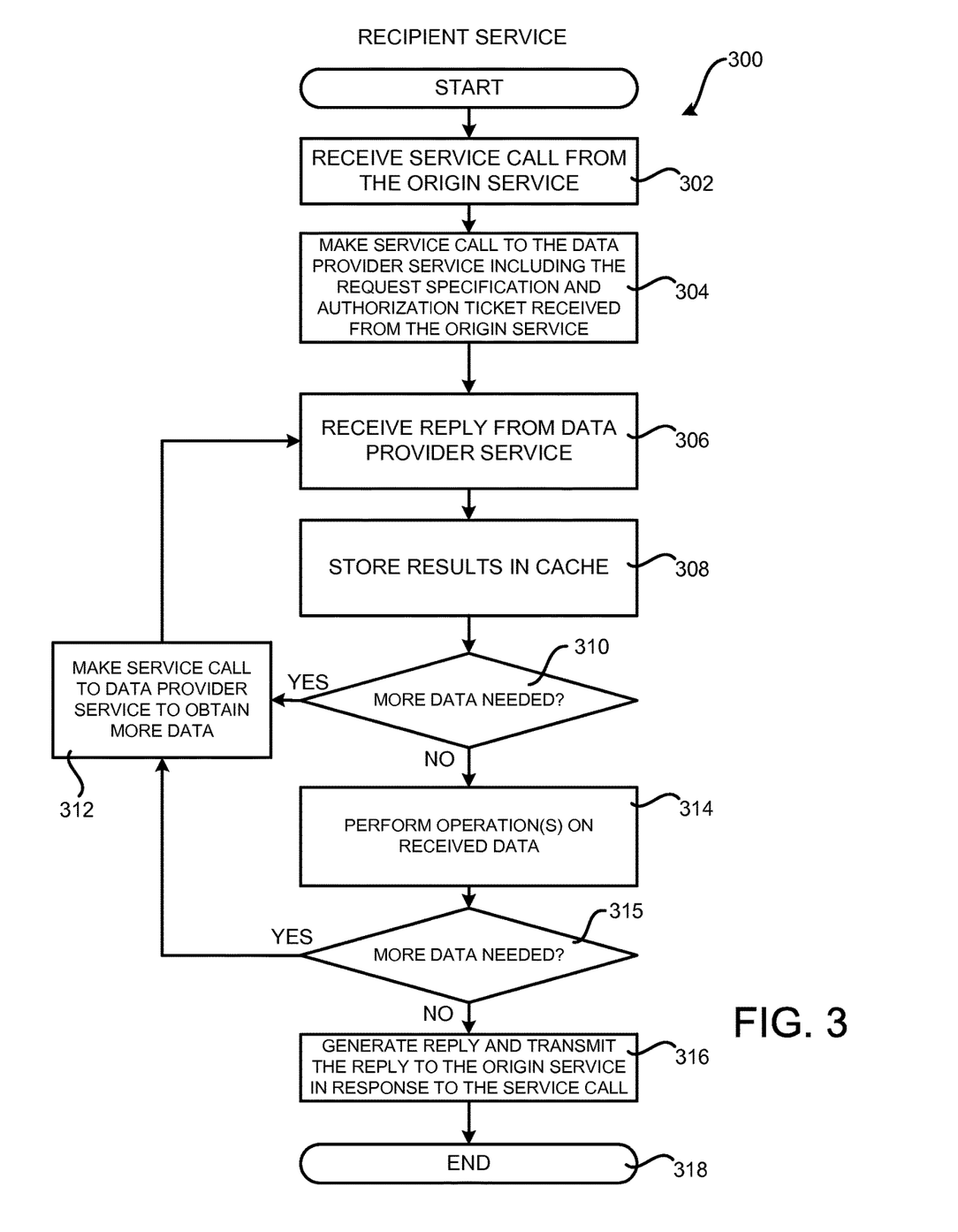
FIG. 3 is a flow diagram showing a routine that illustrates aspects of the operation of a recipient service in a mechanism for delegating requests in a SOA environment according to one embodiment disclosed herein.

FIG. 3 is a flow diagram showing a routine 300 that illustrates aspects of the operation of the recipient service 104 in a mechanism for delegating requests in a SOA environment 100 according to one embodiment disclosed herein. The routine 300 begins at operation 302, where the recipient service 104 receives the service call 100A from the origin service 102. In response to receiving the service call 110A, the routine 300 proceeds from operation 302 to operation 304, where the recipient service 104 begins performing its processing operations. In particular, if the recipient service 104 determines that additional data values are needed to perform its processing (i.e. data values in addition to any data values 116 provided in the service call 110A), the recipient service 104 may make a service call 110B to the data provider service 106 to obtain the additional data values. As shown in FIG. 1A and described above, the service call 110B generated by the recipient service 104 includes the request specification 112A and the authorization ticket 114A provided by the origin service 102 in the service call 110A.

As mentioned above, the data provider service 106 receives the service call 110B from the recipient service 104 and, in turn, utilizes the contents of the authorization ticket 114A to determine whether the origin service 102 has properly delegated authority to the recipient service 104 to retrieve data from the data provider service 106. If the data provider service 106 verifies the authenticity of the authorization ticket 114A and the request specification 112A and also determines that the recipient service 104 has been authorized to act on behalf of the origin service 102, the data provider service 106 will perform the request defined by the request specification 112A. For example, and without limitation, the data provider 106 might generate a reply 118A to the service call 110B that includes data values 120. The recipient service 104 receives the reply 118A at operation 306 of the routine 300.

From operation 306, the routine 300 proceeds to operation 308, where the recipient service 104 may also store data values 120 received from the data provider service 106 in the cache 124A. As discussed above, the recipient service 104 may utilize the contents of the cache 124A when processing future service calls from the origin service 102 or another service. In this way, the recipient service 104 may be able to process future service calls without requesting data from the data provider service 106. In some embodiments, the recipient service 104 also caches the results 122 of its calculations. The cached results 122 might also be utilized to respond to future service calls without calling the data provider service 106.

From operation 308, the routine 300 proceeds to operation 310, where the recipient service 104 determines if additional data is need to complete its processing operations. If additional data is needed, the routine 300 proceeds from operation 318 to operation 312, where the recipient service 104 makes another service call to the data provider service 106 for additional data values. As discussed above, in some embodiments, the data provider service 106 supplies an authorization ticket 114B and a request specification 112B for use in making these additional service calls. These operations may continue until the recipient service 104 has obtained all of the data it needs in order to perform its processing. Once the recipient service 104 has obtained the data needed to perform its processing, the routine 300 proceeds from operation 310 to operation 314.

At operation 314, the data provider service 106 performs its processing operations in order to generate a result 122. As discussed above, the recipient service 104 may perform its processing operations on the data values 120 returned from the data provider service 106 and/or any data values 116 provided from the origin service 102 in the initial service call 110A. The routine 300 then proceeds from operation 314 to operation 315, where the recipient service determines if additional data is needed to perform its computations. If additional data is needed, the routine 300 proceeds from operation 315 to operation 312, where additional data may be obtained in the manner described above. If no additional data is needed, the routine 300 proceeds from operation 315 to operation 316, where the recipient service 104 provides a reply 118B to the service call 110A that includes the results 122 of its computation. From operation 316, the routine 300 proceeds to operation 318, where it ends.

It should be appreciated that a reply 118B is generated and transmitted to the origin service 102 in the embodiment shown in FIG. 3. In other embodiments, however, the recipient service 104 might stream partial results 122 to the origin service as the results 122 are being generated. In this way, the origin service 102 may receive the partial results 122 and begin processing the received results 122 before the recipient service 104 has completed the generation of all of the results 122. Other configurations might also be utilized.

Figure 4:
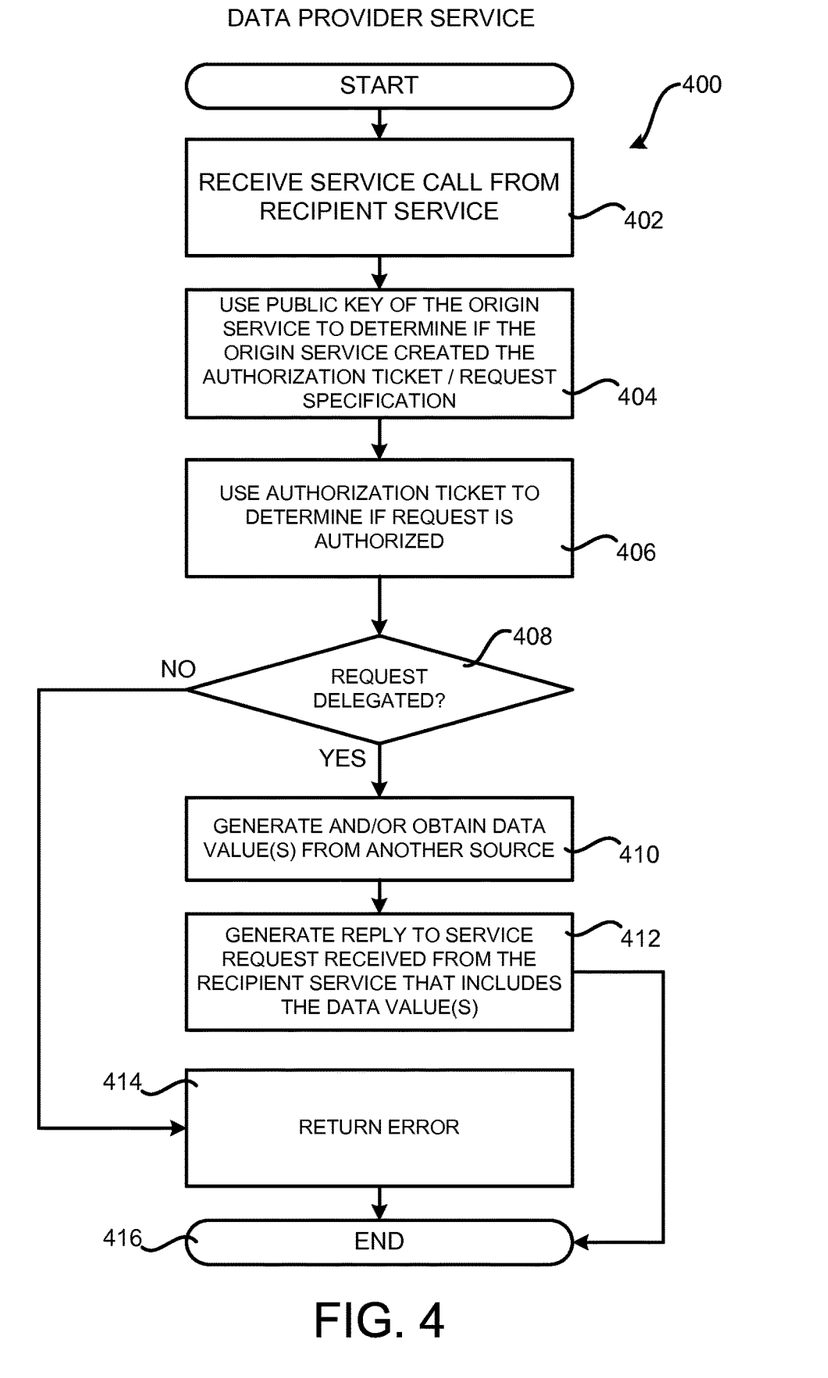
FIG. 4 is a flow diagram showing a routine that illustrates aspects of the operation of a data provider service in a mechanism for delegating requests in a SOA environment according to one embodiment disclosed herein.

FIG. 4 is a flow diagram showing a routine 400 that illustrates aspects of the operation of the data provider service 106 in a mechanism for delegating requests in a SOA environment 100 according to one embodiment disclosed herein. The routine 400 begins at operation 402, where the data provider service 106 receives the service call 110B from the recipient service 104. In response to receiving the service call 110B, the routine 400 proceeds to operation 404, where the data provider service 106 may utilize the public encryption key of the origin service 102 to verify that the origin service 102 created the authorization ticket 114A and/or the request specification 112A. Other mechanisms might also be utilized to verify the origin service 102 as the creator of these items.

If the data provider service 106 verifies that the origin service 102 created the authorization ticket 114A and the request specification 112A, the routine 400 proceeds to operation 406, where the data provider service 106 utilizes the contents of the authorization ticket 114A to determine whether the origin service 102 has delegated authority to the recipient service 104 to retrieve data from the data provider service 106. As discussed above, the data provider service 106 may utilize various mechanisms to make this determination based upon the type of data provided in the authorization ticket 114A.

If the data provider service 106 determines that the recipient service 104 has not been delegated authority to act on behalf of the origin service 102, the routine 400 proceeds from operation 408 to operation 414 where the data provider service 106 may provide an error message to the recipient service 104 in reply to the service call 110B. If, however, the data provider service 106 determines that the recipient service 104 has been delegated authority to act on behalf of the origin service 102, the routine 400 proceeds from operation 408 to operation 410 where the data provider service 106 performs the request defined by the request specification 112A in order to obtain and/or generate data values 120. For example, and without limitation, the data provider 106 might generate the data values 120 by retrieving the data values 120 from a data store, generating the data values 120 by performing computations or other types of processing operations, and/or obtain the data values 120 in some other manner.

Once the data provider service 106 has generated the data values 120, the routine 400 proceeds from operation 410 to operation 412, where the data provider service 106 generates a reply 118A to the service call 110B that includes data values 120. As discussed above, the data provider service 106 is also configured in some embodiments to include an authorization ticket 114B and a request specification 112B in the reply 118A. The recipient service 104 may utilize the authorization ticket 114B and the request specification 112B to obtain additional data values from the data provider service 106. From operation 412, the routine 400 proceeds to operation 416, where it ends.

Figure 5:
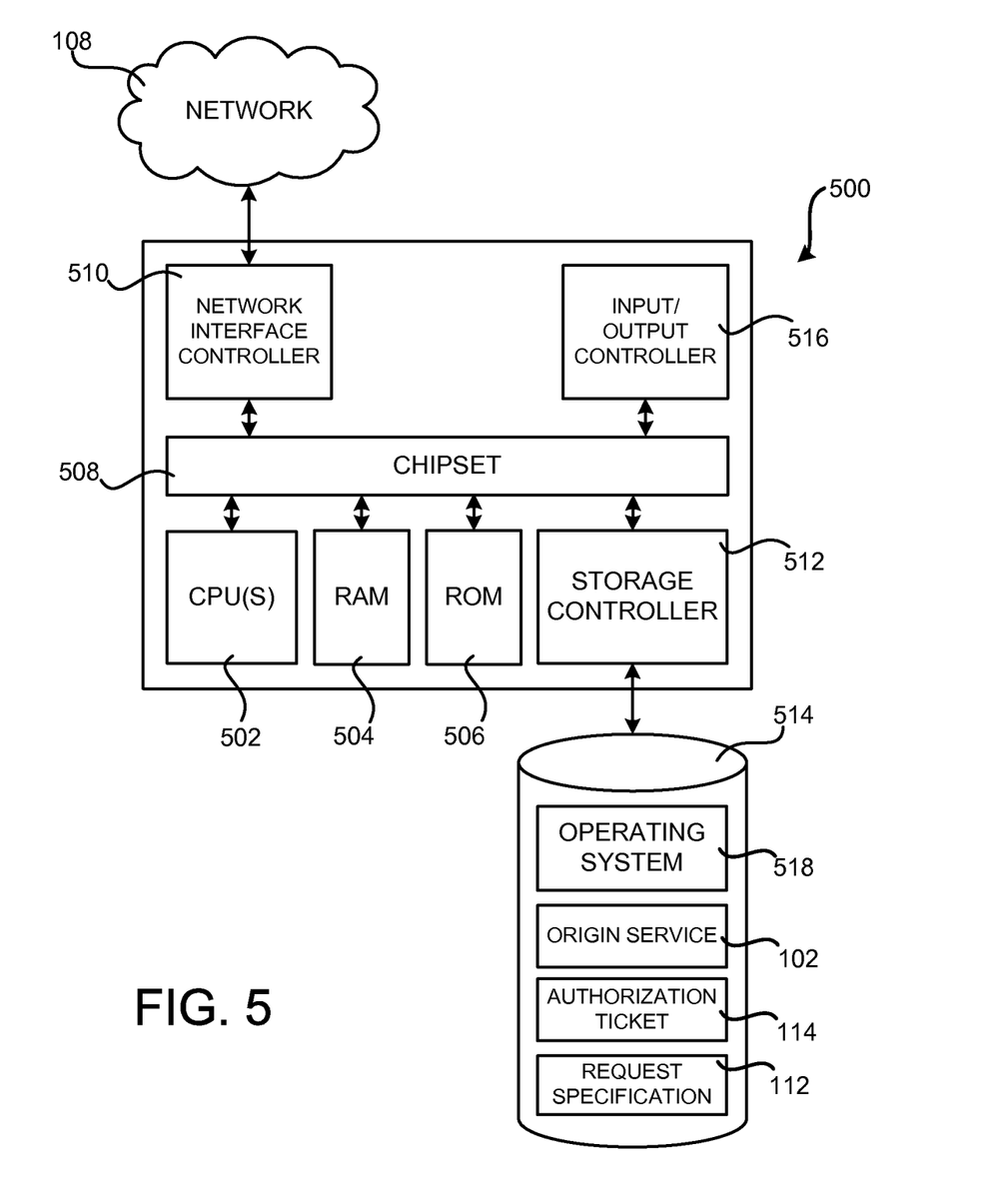
FIG. 5 is a computer architecture diagram showing an illustrative computer hardware architecture for computing devices described in embodiments presented herein.

FIG. 5 shows an example computer architecture for a computer 500 capable of executing the software components described herein. The computer architecture shown in FIG. 5 illustrates a conventional server computer, workstation, desktop computer, laptop, network appliance, tablet computing device, electronic book reader, digital cellular phone, or other computing device, and may be utilized to execute any aspects of the software components presented herein. For example, and without limitation, the computer architecture shown in FIG. 5 might be utilized to implement computer systems in the SOA environment 100 that execute one or more software components for implementing the functionality described above that is provided by the origin service 102, the recipient service 104 and/or the data provider service 106. Other types of hardware architectures might also be utilized.

The computer 500 includes a baseboard, or "motherboard," which is a printed circuit board to which a multitude of components or devices may be connected by way of a system bus or other electrical communication paths. In one illustrative embodiment, one or more central processing units ("CPUs") 502 operate in conjunction with a chipset 508. The CPUs 502 are standard programmable processors that perform arithmetic and logical operations necessary for the operation of the computer 500.

The CPUs 502 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 508 provides an interface between the CPUs 502 and the remainder of the components and devices on the baseboard. The chipset 508 may provide an interface to a random access memory ("RAM") 504, used as the main memory in the computer 500. The chipset 508 may further provide an interface to a computer-readable storage medium such as a read-only memory ("ROM") 506 or non-volatile RAM ("NVRAM") for storing basic routines that help to startup the computer 500 and to transfer information between the various components and devices. The ROM 506 or NVRAM may also store other software components necessary for the operation of the computer 500 in accordance with the embodiments described herein.

According to various embodiments, the computer 500 may operate in a networked environment using logical connections to remote computing devices and computer systems through the network 108, such as a LAN, a WAN, the Internet, or any other networking topology known in the art that connects the computer 500 to remote computers. The chipset 508 includes functionality for providing network connectivity through a network interface controller ("NIC") 510, such as a gigabit Ethernet adapter. The NIC 510 is capable of connecting the computer 500 to other computing devices over the network 108. It should be appreciated that any number of NICs 510 may be present in the computer 500, connecting the computer 500 to various types of networks and remote computer systems.

The computer 500 may be connected to a mass storage device 514 that provides non-volatile storage for the computer 500. The mass storage device 514 may store system programs, application programs, other program modules, and data, which are described in greater detail herein. The mass storage device 514 may be connected to the computer 500 through a storage controller 512 connected to the chipset 508. The mass storage device 514 may consist of one or more physical storage units. The storage controller 512 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 500 may store data on the mass storage device 514 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 514 is characterized as primary or secondary storage, and the like. For example, the computer 500 may store information to the mass storage device 514 by issuing instructions through the storage controller 512 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 may further read information from the mass storage device 514 by detecting the physical states or characteristics of one or more particular locations within the physical storage units.

In addition to the mass storage device 514 described above, the computer 500 may have access to other computer-readable storage media to store and retrieve information, such as program modules, data structures, or other data. It should be appreciated by those skilled in the art that computer-readable storage media can be any available non-transitory media that may be accessed by the computer 500. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 514 may store an operating system 518 utilized to control the operation of the computer 500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 514 may store other system or application programs and data utilized by the computer 500. For example, when the computer 500 is utilized to implement the origin service 102, the mass storage device 514 may store the origin service 102, the authorization ticket 114, and the request specification 112. The mass storage device 514 might also store other components when utilized to implement the recipient service 104 and the data provider service 106. The mass storage device 514 might also store other programs and data not specifically identified herein.

In one embodiment, the mass storage device 514 or other computer-readable storage media may be encoded with computer-executable instructions that, when loaded into the computer 500, may transform the computer from a general-purpose computing system into a special-purpose computer capable of implementing the embodiments described herein. These computer-executable instructions transform the computer 500 by specifying how the CPUs 502 transition between states, as described above. According to one embodiment, the computer 500 may have access to computer-readable storage media, such as an optical disk, a solid-state storage device, or a magnetic storage device, storing computer-executable instructions that, when executed by the computer 500, perform the routines 200, 300 and 400 described above with regard to FIGS. 2, 3, and 4, respectively.

The computer 500 might also include an input/output controller 516 for receiving and processing input from a number of input devices, such as a keyboard, a mouse, a touchpad, a touch screen, an electronic stylus, or other type of input device. Similarly, the input/output controller 516 may provide output to a display, such as a computer monitor, a flat-panel display, a digital projector, a printer, a plotter, or other type of output device. It will be appreciated that the computer 500 may not include all of the components shown in FIG. 5, may include other components that are not explicitly shown in FIG. 5, or may utilize an architecture completely different than that shown in FIG. 5.

Based on the foregoing, it should be appreciated that various concepts and technologies for request delegation in an SOA environment 100 have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A system for delegating a request from a first service to a second service in a service-oriented architecture (SOA) environment, the system comprising:
   one or more first computers implementing the first service, the first service configured to:
      generate a first service call to the second service, the first service call comprising a first request specification delegating authority to the second service to obtain a plurality of data values from a third service on behalf of the first service for use in performing a computation; and
   one or more second computers implementing the second service, the second service configured to:
      obtain a first subset of the plurality of data values from the third service in response to receiving the first service call from the first service by generating a second service call to the third service, the second service call comprising the first request specification,
      receive a second request specification from the third service,
      perform a first part of the computation using the first subset of the plurality of data values to generate an intermediate result,
      obtain a second subset of the plurality of data values from the third service based on whether the intermediate result satisfies the first service call by generating a third service call to the third service, the third service call comprising the second request specification,
      perform a second part of the computation using the intermediate result and the second subset of the plurality of data values to generate a responsive result, and
      transmit a reply to the first service call received from the first service, the reply comprising the responsive result.

2. The system of claim 1, further comprising one or more third computers implementing the third service, the third service configured to receive the second service call from the second service, determine whether the first service has authorized the second service to obtain the first subset of the plurality of data values on its behalf, and in response to determining that the first service has authorized the second service to obtain the first subset of the plurality of data values on its behalf, providing the first subset of the plurality of data values to the second service.

3. The system of claim 1, wherein the first service call from the first service to the second service further comprises an authorization ticket by which the third service can determine that the first service has authorized the second service to obtain the plurality of data values from the third service on behalf of the first service.

4. The system of claim 3, wherein the third service is further configured to determine based upon the authorization ticket whether the first service has authorized the second service to obtain the plurality of data values on behalf of the first service and to provide the first subset of the plurality of data values in response to determining that the first service has authorized the second service to obtain the plurality of data values on its behalf.

5. The system of claim 4, wherein the first service obtains the authorization ticket from the third service.

6. A computer-implemented method for processing a request delegated from a first service to a second service in a service-oriented architecture (SOA) environment, the method comprising:
- receiving a first service call from the first service, the first service call comprising a first request specification delegating authority to the second service to obtain a plurality of data values from a third service on behalf of the first service for use in performing a computation;
- obtaining a first subset of the plurality of data values from the third service by generating a second service call to the third service, the second service call comprising the first request specification;
- receiving a second request specification from the third service;
- performing a first part of the computation using the first subset of the plurality data values to generate an intermediate result;
- obtaining a second subset of the plurality of data values from the third service based on whether the intermediate result satisfies the first service call by generating a third service call to the third service, the third service call comprising the second request specification;
- perform a second part of the computation using the intermediate result and the second subset of the plurality of data values to generate a responsive result; and
- transmitting a reply to the first service call received from the first service, the reply comprising the responsive result.

7. The computer-implemented method of claim 6, wherein the first service call received from the first service further comprises an authorization ticket comprising data by which the third service can determine that the first service has authorized the second service to obtain the data on its behalf.

8. The computer-implemented method of claim 6, further comprising:
- storing the plurality of data values obtained from the third service in a cache; and
- utilizing the plurality of data values stored in the cache to respond to future service calls received from the first service.

9. The system of claim 3, wherein the second service provides the authorization ticket to the third service in the second service call.

10. The system of claim 1 wherein the second service receives an authorization ticket from the third service.

11. The system of claim 10 wherein the third service call further comprises the authorization ticket.

12. The system of claim 1 wherein the first request specification and the second request specification are the same.

13. The computer-implemented method of claim 7, wherein the second service call comprises the authorization ticket.

14. The computer-implemented method of claim 6 further comprising receiving, from the third service, an authorization ticket responsive to the second service call.

15. The computer-implemented method of claim 14 wherein the third service call comprises the authorization ticket.

16. The computer-implemented method of claim 6 wherein the first request specification and the second request specification are the same.

17. A system for processing a request delegated from a first service to a second service in a service-oriented architecture (SOA) environment, the system comprising:
- one or more processors executing the second service;
- one or more non-transitory computer readable storage media storing computer-executable instructions that when executed by the one or more processors cause the one or more processors to perform operations comprising:
  - receiving, by the second service, a request specification and a first authorization ticket from the first service, the request specification identifying a third service from which to obtain a plurality of data values and the first authorization ticket providing authority to the second service to obtain a plurality of data values from the third service on behalf of the first service;
  - sending the request specification and the first authorization ticket to the third service to obtain a first subset of the plurality of data values from the third service;
  - receiving the first subset of the plurality of data values and a second authorization ticket from the third service;
  - performing a first computation using the first subset of the plurality data values to generate an intermediate result;
  - sending the second authorization ticket to the third service to obtain a second subset of the plurality of data values from the third service;
  - perform a second computation using the intermediate result and the second subset of the plurality of data values to generate a responsive result; and
  - transmitting a reply to the first service, the reply comprising the responsive result.

18. The system of claim 17 wherein the computer-executable instructions cause the one or more processors to perform operations further comprising:
- storing the plurality of data values obtained from the third service in a cache; and
- utilizing the plurality of data values stored in the cache to respond to future service calls received from the first service.

19. The system of claim 17 wherein the request specification identifies the third service.

20. The system of claim 17 wherein the first authorization ticket is generated by the third service.

21. The system of claim 17 wherein the first authorization ticket is cryptographically signed by the first service.

22. The system of claim 17 wherein the first authorization ticket comprises a list of one or more services authorized to obtain data on behalf of the first service, and wherein the third service is configured to determine if the second service is identified in the list of one or more services prior to providing the first subset of the plurality of data values to the second service.

* * * * *